United States Patent [19]

Theodore

[11] 4,293,477

[45] Oct. 6, 1981

[54] HIGHLY FILLED THERMALLY CONDUCTIVE ELASTOMERS III

[75] Inventor: Ares N. Theodore, Farmington Hills, Mich.

[73] Assignee: Ford Motor Company, Dearborn, Mich.

[21] Appl. No.: 109,446

[22] Filed: Jan. 4, 1980

[51] Int. Cl.³ .................... C08K 3/08; C08K 3/10; C08K 3/20; C08L 83/14

[52] U.S. Cl. .................. 260/29.1 SB; 260/37 SB; 260/37 M

[58] Field of Search .......... 260/37 SB, 37 M, 29.1 SB

[56] References Cited

U.S. PATENT DOCUMENTS

| | | | |
|---|---|---|---|
| 3,011,987 | 12/1961 | Walton et al. | 260/18 |
| 3,098,836 | 7/1963 | Bobsar | 260/37 SB |
| 3,177,238 | 4/1965 | Rinse | 260/448.8 |
| 3,179,543 | 4/1965 | Fischer | 156/272 |
| 3,184,427 | 5/1965 | Russell et al. | 260/37 SB |
| 3,255,152 | 6/1966 | Kniege | |
| 3,274,145 | 9/1966 | Dupree | 260/37 SB |
| 3,399,082 | 8/1968 | Henderson et al. | 136/203 |
| 3,499,859 | 3/1970 | Matherly | 260/37 SB |
| 3,506,607 | 4/1970 | Robear | 260/37 SB |
| 3,676,420 | 7/1972 | Fulton et al. | 260/37 SB |
| 3,746,662 | 7/1973 | Adelman | 260/37 M |
| 3,791,998 | 2/1974 | Bruns | 260/37 SB |
| 3,865,784 | 2/1975 | Neale et al. | 260/37 SB |
| 3,867,315 | 2/1975 | Tigner et al. | 260/37 M |
| 3,933,712 | 1/1976 | Vanaglash | 260/37 SB |
| 3,968,055 | 7/1976 | Palmer | 260/37 SB |
| 3,969,310 | 7/1976 | Itoh et al. | 260/37 SB |
| 3,970,504 | 7/1976 | Palmer | 260/37 SB |
| 4,009,043 | 2/1977 | Preis | 260/37 SB |
| 4,025,485 | 5/1977 | Kodama et al. | 260/37 SB |
| 4,026,835 | 5/1977 | Lee et al. | 260/37 SB |
| 4,026,868 | 5/1977 | Merrill | 260/37 SB |
| 4,069,083 | 1/1978 | Palmer | 260/37 SB |
| 4,070,329 | 1/1978 | Homan et al. | 260/37 SB |
| 4,075,154 | 2/1978 | Itoh et al. | 260/37 SB |
| 4,076,684 | 2/1978 | Wohlfarth et al. | 260/37 SB |
| 4,130,707 | 12/1978 | Leiser et al. | 260/37 SB |
| 4,148,354 | 4/1979 | Rao | 163/8 |

*Primary Examiner*—Allan Lieberman
*Attorney, Agent, or Firm*—Lorraine S. Melotik; Roger L. May

[57] ABSTRACT

A thick, highly filled, shaped elastomeric body comprising a thermally conductive elastomer suitable for high temperature, e.g. 240°–260° C. mechanical applications. The elastomer composition comprises organopolysiloxane, particulates, and a viscosity modifier. The organopolysiloxane crosslinks between the vinyl or allyl functionality of an organopolysiloxane polymer, and the silyl hydride functionality of an organopolysiloxane oligomer. The particulate comprises silica as well as a thermally conductive alloy powder of first row transition elements. The addition of a viscosity modifier comprising silicone oil is essential to the inclusion of the high levels of particulates.

7 Claims, No Drawings

HIGHLY FILLED THERMALLY CONDUCTIVE ELASTOMERS III

Related commonly assigned applications filed concurrently with this application are U.S. applications Ser. Nos. 109,439 to Ares N. Theodore et al titled "Highly Filled Thermally Conductive Elastomers IV", 109,440 to Ares N. Theodore titled "Highly Filled Thermally Conductive Elastomers II", and 109,445 to Ares N. Theodore et al titled "Highly Filled Conductive Elastomers I".

BACKGROUND OF THE INVENTION

Elastomers for use in rotary regenerator assemblies are known, e.g., see U.S. Pat. No. 4,148,354 which is herein hereby incorporated by reference. These assemblies comprise ceramic core surrounded by steel ring gear with elastomer therebetween. The elastomer accomodates differential rates of expansion during assembly and during operation.

Materials proposed in U.S. Pat. No. 4,148,354, while satisfactory, do have certain deficiencies. For example, the materials may not function optimally under certain conditions for as long periods as might be desired.

A particularly acute problem is that these materials tend to degrade during extended high temperature service. Others have proposed certain filled organosiloxane and other organic polymers for use in making articles that resist degradation when exposed to extreme conditions. See, for example, U.S. Pat. Nos. 3,098,836; 3,255,152; 3,274,145; 3,506,607; 3,676,420; 3,746,662; 3,791,998; 3,865,784; 3,867,315; 3,911,045; 4,025,485; and 4,069,083.

These patents show that desirable properties may result by loading certain organic polymers with inorganic particulate.

It has been discovered in accordance with this invention that besides enhancing certain physical properties as well as potentially reducing material costs, certain particulates also offer improved thermal stability. Improved thermal stability is insufficient by itself, however, to provide a more acceptable material for applications as ring gear assemblies. Rather, such improved thermal stability, when provided by increased particulate loading, is accompanied typically by higher initial viscosities and shorter working times. The higher initial viscosities and shorter working times can make such materials undesirable for high volume production use.

It is an object of this invention to provide elastomers with improved thermal stability.

It is an object of this invention to provide elastomers with improved thermal stability and whose precursors have desirable initial viscosities and working times.

It is an additional object of this invention to provide elastomer precursors for filling difficult to fill mold cavities.

It is even a still further object of this invention to provide improved elastomer for use in rotary regenerators comprising ceramic core surrounded by steel or other metal ring gear.

These and other objects have been accomplished with elastomers made in accordance with the hereinafter disclosed invention.

BRIEF DESCRIPTION OF THE INVENTION

This invention relates to highly filled, thermally conductive elastomers made from ingredients that include organopolysiloxanes and inorganic particulate. By admixing these and other essential ingredients in certain ways, there is provision of elastomer precursor compositions that readily fill difficult to fill mold cavities and yet, when cured, exhibit such physical and thermal properties as to make them admirably suited for high temperature, mechanical service.

In elastomer precursor compositions of this invention, crosslinking occurs between such functional groups as vinyl of one organopolysiloxane and such functional groups as silyl hydride

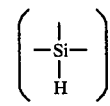

of another organopolysiloxane in the presence of catalyst and certain other ingredients. Among these other ingredients are thermally conductive particulates that contribute to high temperature stability and improved physical properties of the elastomer.

Certain viscosity modifiers serve to facilitate incorporation of high particulate levels into the elastomer precursors while at the same time permitting desired initial viscosities and working times. By selection and control of particulate size and amount as well as viscosity modifier type and amount, there is a net increase in thermal and physical properties. At the same time there is provision thereby of elastomer precursors with such initial viscosities and working times as to permit ready incorporation into difficult to fill mold cavities.

Surprisingly, even though the viscosity modifier is liquid and may be expected to be non-reactive, the amount of metallic particulate, for example, that it allows to be effectively incorporated gives elastomers which show even less high temperature weight loss than the same elastomers without any metallic particulate and viscosity modifier. Thus, the metal and liquid viscosity modifier combination in the elastomer acts, with respect to thermal aging, as if it were a more stable filled, crosslinked polymer than the filled, crosslinked organopolysiloxane polymer without such combination. With spherical or irregular shaped particles (e.g. $L/D \leq 8$) as the powders of this invention, the above described benefit is particularly notable.

DESCRIPTION OF THE INVENTION

The elastomers of this invention are made by intimately admixing a polymer containing base component (Component I) and an oligomer containing component (Component II). With admixture, the polymer and oligomer in the Components I and II crosslink at room temperature (or elevated temperature, if desired) to provide (with the other ingredients in the components) thermally conductive elastomers. The ingredients of Components I and II preferably are as follows:

A. Component I. Component I comprises 100 parts by weight of a crosslinkable polymer (Polymer I). Polymer I is of a formula corresponding to

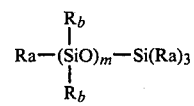

wherein at least most of the Ra's and Rb's are independently selected from (A) any one or more of 1. saturated hydrocarbyl groups having from about 1–10 carbon atoms or 2. saturated hydrocarbyloxy groups having from 1 to about 10 carbon atoms that are alkyl or aryl or alkyl and aryl carbons and (B) either or both allyl or vinyl which may be substituted by halo or saturated hydrocarbyl or hydrocarbyloxy groups between about 1–8 carbon atoms that are alkyl or aryl or aryl and alkyl carbon atoms and wherein there are up to two substituents of these substituents per vinyl or allyl. Up to about 25% (preferably up to 10%), however, of the total number of Rb's may correspond to the formula:

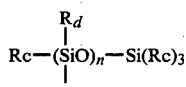
I(a)

wherein at least most of the Rc's and Rd's are selected from (A) and (B) above but up to about 10% (preferably 5%) of the total number of Rd's may contain additional siloxane units such as those of formula I(a) above with substituents selected from (A) and (B) above or still additional siloxane units. Provided, however, there is (1) an average number of siloxane units (i.e. m plus all n's plus the total number of end groups) per polymer molecule between about 100 and 300 (preferably 150–250) and (2) an average of above about 1.5 but lower than 6 (preferably about 1.5–2.5) crosslinking sites selected from the vinyl, allyl or vinyl and allyl groups per polymer molecule. Preferably, m averages between about 170–220 and n is below 50. More preferably n is below 25 and less than 10% of the Rb's are siloxane units. Also, preferably the vinyl or allyl groups are on end siloxane groups e.g., the vinyl or allyl groups in the position of Ra or Rc. Examples of the saturated hydrocarbyl and the saturated hydrocarbyl of the saturated hydrocarbyloxy include: alkyl, aryl, alkaryl, aralkyl such as straight or branched alkyl, straight or branched alkyl substituted phenyl, phenyl, phenyl substituted straight or branched alkyl including for example methyl, ethyl, butyl, methylphenyl, phenylethyl etc. any of which may be substituted by normally unreactive substituents such as halo (e.g. chloro) or interrupted by oxy (—O—). Examples of commercially available polymers for Polymer I are Silastic J, E & L RTV silicone elastomers available from Dow Corning Corporation.

Especially preferred polymers for Polymer I of Component I correspond mostly by weight (e.g. 90% or higher) to the formula:

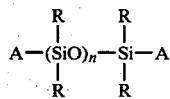
I' wherein each R is independently a monovalent aliphatic or aromatic group or combination thereof up to about 8 carbons and preferably is $R'(O)_x$ wherein x is zero or 1; and R' is independently phenyl or alkyl of up to about 6 carbons (more preferably 3) or alkylphenyl (or phenylalkyl) having up to about 6 alkyl carbons (more preferably up to 3 alkyl carbons; A is vinyl; and n averages between about 150–200.

Component I also contains silica particulate intimately admixed with the Polymer I. The silica preferably is a combination of silicas comprising ground and fumed silicas. Preferably the weight ratio of silica to Polymer I is between about 0.3 to 2.5:1, more preferably between about 0.9:1 to 1:0.9.

The silica is desirably of small particle size so as to not only provide reinforcement but also impart thixotropic behavior to the compositions. Preferred Polymer I and silica admixtures have viscosities between about 500–1500 poises at 25° C.

As mentioned, it is preferred to have a combination of silicas comprising ground and fumed silica. Normally, the weight of ground silica such as those having an average (i.e. mean) diameter between about 0.1–15 (more preferably 0.5–10) microns will desirably far exceed the weight of fumed silica e.g. a weight ratio of 2:1 or more as preferably between about 5:1 to 19:1. The fumed silica (at an average (i.e. mean) particle diameter of between about 0.005–0.015 microns, more preferably between about 0.010 microns and 0.014 microns) provides reinforcement to the elastomer. The ground silica imparts better flow properties to the uncured elastomer composition. The balance of these two silica types then is of importance for control of desired elastomer precursor and cured elastomer properties.

Other inorganic particles that may be added include, for example, glass fibers, if additional reinforcement (especially improved hot tear resistance) of the elastomer is desired. Chopped fiber in lengths of between about 0.34 and 1.25 centimeters especially between about 0.5–1 centimeters are preferred. Improved adhesion of glass fiber in the cured thermally conductive elastomer can be accomplished through coating of the glass fibers with primers which are commercially available. For example, Dow Corning Primer Q 3-6061 (e.g. at 0.15 g primer to 1 kg glass fibers) diluted with methylene chloride may be used to pack and coat the glass fibers. Other fibers such as carbon, graphite, cellulose and metal may be employed together with or in place of the glass fibers.

In addition, still other ingredients such as zinc oxide, lamp black and the like may be included in component I to improve heat stability and the like functions. Preferably, component I contains a metal catalyst (such as platinum) to reduce cure time and temperature. (See, for example, U.S. Pat. No. 4,076,684, col. 6, lines 49–68, col 7, lines 1–2, and the paragraph bridging cols 7 and 8) which are hereby herein incorporated by reference. A preferred catalyst is a platinum complexed silicone oligomer. The oligomer may be of the structure of Polymer I but wherein m averages less than 50 e.g. 15 or less. Additionally it is preferred to use a modifier with these systems that slows increase in viscosity due to crosslinking e.g. snap time modifiers available from Dow Corning Corporation, benzotriazole, etc. Such modifiers are commercially available and are preferably vinyl silicones of up to 15 repeating siloxane units with desirably up to about 5 vinyl groups. These vinyl silicones serve to slow down the crosslinking reaction thereby slowing increase in viscosity. Other modifiers available for this purpose include quinoline, triphenyl phosphite, dimethyl sulfoxide, perchloroethylene, etc. known to those in the art. Other catalyst may also be used, e.g. peroxides, alkoxides and the like as well as modifiers as is well known in the art.

Essential to elastomers of this invention are conductive powders which improve thermal properties of the elastomer. Among the conductive powders are metal powders of silver, gold, silicon, aluminum, nickel, cadmium, palladium, molybdenum, magnesium, chromium, zinc, rhodium, tungsten and the like having particle sizes (i.e. mean diameter) between about 40-300 microns. Certain transition metal such as copper are less desirable for high temperature (e.g. 260° C.) environments of the cured articles during long exposures (e.g. 500 hours) at such temperatures. In general, however, the conductive powders have a conductivity above that of silica and more preferably above about 0.5 cal.cm.$(C.cm^2.sec)^{-1}$ at 68° F.

It is found that even better properties are obtained with powders that are alloys, especially single phase alloys, especially in compositions having highest desired conductive powder loading. Examples of these alloys are alloys of at least about 25% by weight first row transition metals including, for example, tungsten-copper, nickel-aluminum, nickel-copper, aluminum-silicon, iron-magnesium-silicon, brasses, bronzes and the like alloys. Commercially available preferred alloys include, for example, Monel, Inconel. The average (i.e. mean) particle diameters range is preferably 40-300 microns for such alloys.

The conductive powder is normally at a weight ratio to Polymer I of between about 0.3 to 2.5:1 (preferably about 0.5:1 to 2.0:1) powder to polymer.

Essential to the addition of high levels of conductive powders is inclusion of certain amounts of viscosity modifiers to control the initial apparent viscosity of these compositions. A careful balance between particulate including conductive powder and viscosity modifier is important to achieve high thermal conductivity without loss of viscosity modifier and consequent decrease in thermal stability and physical properties of the cured compounds. The viscosity modifier is normally at a weight ratio between about 1:20 to 1:4 (more preferably 1:10-1:2) viscosity modifier to the inorganic particulates of silica and conductive powder depending upon certain other features as amount and particle size of conductive powder and other particulates as well as viscosity modifier character.

The viscosity modifier preferably comprises a silicone oil having a viscosity of between about 1000-1,000,000 centistokes at 25° C., more preferably 5000-1,000,000 centistokes at 25° C. Preferred viscosity modifiers include those having a formula which corresponds to formula I above for Polymer I except that the vinyl group is replaced by groups similar to the other on the backbone, e.g. alkyl or alkoxy of between about 1-10 carbon atoms. Especially preferred viscosity modifiers are dimethyl silicone oils i.e. polymers of formula I above wherein at least most of the $R_a$'s and $R_b$'s are methyl and particularly wherein there is minimum branching e.g. wherein less than 10% of the Rb's are siloxane units. In addition to dimethyl silicone oils, however, other examples of silicone oils that may be used alone or in combination with dimethyl silicone oils include, for example, methyl phenyl silicone, branched methyl phenoxy silicone, branched chlorophenyl methyl silicone, flurosilicone, nitrile silicone, methyl hydrogen and methyl vinyl silicone oils.

Especially preferred viscosity modifiers correspond to the formula:

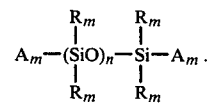

wherein $R_m$ and $A_m$ comprise alkyl of 1-8 carbons or phenyl or phenyl substituted by alkyl or alkoxy of 1-8 carbons or halo such as chloro; and n is above about 15.

B. Component II. Component II comprises an oligomer (hereinafter, Oligomer I) that crosslinks with Polymer I through the vinyl groups of Polymer I and silyl hydride groups of Oligomer I. Oligomer I preferably has a formula corresponding to that of formula I except that there are an average of more than 1 and less than about 20 silyl hydride groups

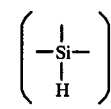

rather than any vinyl or allyl groups; the total number of siloxy groups (i.e. total of all m and n's) averages between about 5-50; and there is little, if any, branching e.g. less than about 5% of the Rb's are siloxane units. Examples of such oligomers include Silastic J curing agent available from Dow Corning Corporation.

Preferred oligomer crosslinking agents correspond to the formula:

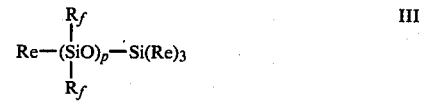

wherein Re and Rf are selected from hydrogen and saturated hydrocarbyl or hydrocarbyloxy of between about 1-10 carbon atoms optionally substituted by halo such as chloro or interrupted by oxy (—O—); p averages between 6-40 and wherein there is an average of at least about two silyl hydrides groups per polymer and up to about one for each siloxy group, more preferably an average between 5 and 15 silyl hydride groups per polymer chain.

Especially preferred crosslinking agents correspond mostly by weight (e.g. 90% or more) to the formula:

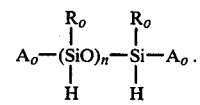

wherein $R_o$ is alkyl or alkoxy of 1-3 carbons; phenyl or phenoxy, preferably methyl; $A_o$ is alkyl of 1-3 carbon atoms or phenyl, preferably methyl; and n is between about 5-14 on the average.

The crosslinking agent is used at a weight ratio with respect to Polymer I of between about 1:3 to 1:20, Polymer III to Polymer I and preferably at least about 1 equivalent of silyl hydride for each equivalent of vinyl or other aliphatic unsaturation.

The elastomer precursor compositions of this invention may also contain other such ingredients which are included typically in compositions of the type disclosed herein, e.g. dyes, heat stabilizers, antioxidants, pigments, adhesion promotors, uv absorbers and the like.

The following procedures are used in the examples below to determine working time and physical and thermal properties:

Working Time: After de-aeration some of mix is poured in a 100 ml. beaker for determination of working time with the Brookfield viscometer. A #4 spindle at 0.6 rpm is used for this measurement with the guard in its proper place. The time required for the spindle to move from the starting point to 100 on the instrument scale is called the working time of a composition.

A. Physical Properties

1. Tensile testing of dumbbell specimens; ASTM D 412 procedure is used for determination of tensile strength, 10% modulus and elongation to break. Dumbbell specimens are cut with the standard die from a thin slab (0.32 cm thick) and used for this testing.

2. Durometer Hardness: The hardness of cured silicone rubber is determined according to ASTM D 2240 procedure.

3. Tear Testing: Tear specimens, cut with a die B, are tested according to ASTM D 624 procedure. Razor-nicked specimens are used for determination of tear resistance.

B. Coefficients of Thermal Expansion: The coefficients of thermal expansion are determined with the Dupont 942 thermomechanical analyzer. Sensitivity of this instrument is checked with an aluminum metal standard. Sample height is 0.60 cm and temperature was programmed at 5° C/mm. In all cases the expansion probe is resting on molded surfaces and has zero load. The coefficients of expansion are calculated for the temperature ranges of 25°–300° C. and 200°–300° C. C. Determination of Thermal Conductivities: The split bar method is used for determining the thermal conductivities of these elastomeric materials. Two specimens are used for these measurements and an average of thermal conductivity is obtained from the two samples. Typical dimensions of thin specimens are 2.14 cm(W)×4.80 cm(L)×0.210 cm(T) and for thick specimen 2.15 cm(W)×4.80 cm(L)×0.65 cm(T). Measurements on two samples of different thickness are used to eliminate temperature drops due to the interfaces between the specimen and copper rod.

The Examples below are intended to illustrate this invention and not necessarily limit its scope.

EXAMPLE 1

The following ingredients in amounts indicated are charged into a Hobart mixer:

| | Component | Amount | |
|---|---|---|---|
| 1. | Silastic J RTV Silicone Elastomer and silica particulate (1) | 2,268.0 | gm. |
| 2. | Kadox 15 ZnO | 14.20 | gm. |
| 3. | Williams 1011 Lampblack | 7.10 | gm. |
| 4. | Glass Fibers (¼" chopped strand coated with primer) | 25.00 | gm. |

After mixing above ingredients for five minutes, this base is stored for subsequent use in the preparation of thermally conductive elastomer compositions.

In compounding the thermally conductive elastomer material, the above base compound is combined with ingredients below in the following manner:

| | Component | Amount |
|---|---|---|
| 1. | Base Material | 400.00 gms. |
| 2. | Silastic J Curing Agent | 40.00 gms. |
| 3. | Cure Modifier E - 1990 - 76 | 0.80 gms. |
| 4. | Silicone Fluid 200 (100,000 centistokes at 25° C.) | 40.00 gms. |
| 5. | Silicon Powder (−325 mesh) | 150.00 gms. |

The silastic J RTV silicone elastomer (base material) and silicon powder are charged in the steel bowl of Ross double planetary mixer. The addition of Silicone Fluid 200 follows with mixing for 4 minutes. The mix is scrapped off the two blades of mixer and allowed to fall in middle of bowl for better mixing. Then the silastic J curing agent and viscosity modifier are added and mixing is completed in 6 more minutes. After de-aeration of mix for 30 minutes, it is ready for molding and determination of working life of compound with the Brookfield viscometer. The working time is 10 hours. Molding of mix follows by pouring part of it in a four cavity mold kept at room temperature. After curing, the compound for 20 minutes (top platen of hydraulic press at 232° C. and bottom at ambient temperature) under 63 tons pressure, the rubber slabs are taken out of mold and post cured in an air circulating oven for 3 hours at 202° C. (Alternatively, curing can also be done by leaving the charged mold at room temperature for 48 hours).

The molded articles exhibit the following physical properties before and after aging at 260° C. for 500 hours.

| Test Temp. | Hardness Shore A | Modulus at 90% Elong. MPa | Tensile Strength MPa | Tear Strength KN/M | Elongation % |
|---|---|---|---|---|---|
| 25° C. | 63 | 0.75 | 4.30 | 14.20 | 57 |
| 232° C. | 63 | 0.73 | 2.40 | 5.05 | 31 |
| 232° C. | 66 | 0.89 | 2.10 | 4.80 | 22 |

*Aged at 260° C. for 500 hours.

Retention of physical properties on aging is excellent with practically no change in hardness. The weight loss on aging is small 3.3 vs. 6.0% compared to materials without the conductive filler. The thermal conductivity is $8.55 \times 10^{-4}$ cal. sec.$^{-1}$ cm.$^{-1}$ °C.$^{-1}$, coefficient of linear thermal expansion is 2.7 $10^{-4}$ in./in./°C. and weight loss on aging at 260° C. for 500 hours is 3.3%. The addition of the conductive filler to the elastomer compositions shows no negative effects and doubles the conductivity of base material.

(1) The silica particulate of the base material is about 1093 parts by weight ground crystalline silica (Min-U-Sil) and about 58 parts by weight fumed silica (Cab-O-Sil MS-75). Min-U-Sil is a white powder with particles having an average diameter of about 5 microns and a specific gravity of about 2.65 Cab-O-Sil MS-75 has with a specific gravity of 2.2 and an average particle diameter between about 0.07–0.1 microns. The base material or base compound further includes less than about 10 parts by weight of a platinum complex catalyst which is a vinyl siloxane oligomer modified by platinum metal (available from Dow Corning Corporation). The base compound with these ingredients has a viscosity between 700–1300 poises at 25° C.

EXAMPLE 2

Example 1 is repeated except the weight of silicon powder 180.0 gms. After mixing all ingredients on a 80×180 mm two-roll vented research mill, the compound has a working time of 7.5 hours.

Specimen molded under the same conditions as materials of Example 1 exhibit good physical properties before and after aging at 260° C. for 500 hours. They also exhibit improved thermal conductivity and lower weight loss as compared to compounds without the silicon.

EXAMPLE 3

A base compound prepared as in Example 1 is compounded with the following ingredients:

| | Component | Amount |
|---|---|---|
| 1. | Base compound (Example 1) | 430.00 gms. |
| 2. | Silicon powder (−325 mesh) | 150.00 gms. |
| 3. | Silicone Fluid 705 | 10.00 gms. |
| 4. | Silastic J Curing Agent | 43.00 gms. |
| 5. | Cure Modifier E - 1990 - 76 | 0.80 gms. |

In this composition the Silicone Fluid #200 is replaced by base material (30 gms.) and lower viscosity Silicone Fluid 705 (10 gms.). After mixing according to procedure of Example 1, the physical properties of virgin and aged specimens are as follows:

| Test Temp. | Hardness Shore A | Modulus at 10% Elong. MPA | Tensile Strength MPa | Tear Strength KN/M | Elongation % |
|---|---|---|---|---|---|
| 25° C. | 70 | 1.25 | 5.40 | 17.50 | 53 |
| 232° C. | 69 | 1.17 | 2.85 | 7.20 | 25 |
| 232° C. | 76 | 1.43 | 2.10 | 6.70 | 16 |

In addition to good retention of physical properties on aging, these articles exhibit improved thermal conductivities and lower weight losses on heat aging at 260° C. for 500 hours.

EXAMPLE 4

A base compound prepared as in Example 1 is combined with the following ingredients according to mixing procedure of Example 1.

| | Component | Amount |
|---|---|---|
| 1. | Base compound (Example 1) | 656.00 gms. |
| 2. | Aluminum Powder (−325 Mesh) | 213.00 gms. |
| 3. | Silicone Fluid 200 (100,000 centistokes at 25° C.) | 65.60 gms. |
| 4. | Silastic J Curing Agent | 65.60 gms. |
| 5. | Cure Modifier E - 1990 - 76 | 1.30 gms. |

The working time of this compound is 10.5 hours.

After molding this silicone elastomer composite according to the conditions described in Example 1, virgin and aged specimens* at 260° C. for 500 hours have the following physical properties:

| Test Temp. | Hardness Shore A | Modulus at 10% Elong. MPa | Tensile Strength MPa | Tear Strength KN/M | Elongation % |
|---|---|---|---|---|---|
| 25° C. | 60 | 0.69 | 3.15 | 11.4 | 43 |
| 232° C. | 59 | 0.66 | 1.54 | 5.0 | 25 |
| 232° C. | 64 | 0.75 | 1.91 | 3.5 | 10 |

These materials exhibit also improved thermal conductivity (7.10 $10^{-4}$ cal. sec.$^{-1}$ cm.$^{-1}$ °C.$^{-1}$) and lower weight loss on aging at 260° C. for 500 hours.

EXAMPLE 5

A base compound prepared as in Example 1 is mixed with the following ingredients:

| | Component | Amount |
|---|---|---|
| 1. | Base compound (Example 1) | 656.00 gms. |
| 2. | Aluminum powder (−325 Mesh) | 350.00 gms. |
| 3. | Silicone Fluid 200 (100,000 centistokes at 25° C.) | 65.60 gms. |
| 4. | Silastic J Curing Agent | 65.60 gms. |
| 5. | Cure Modifier E - 1990 - 76 | 1.30 gms. |

After completion of mixing as in Example 1, the compound has a working time of 6.0 hours. After de-airation molded articles of various thicknesses are prepared by molding at 177° C. for 20 minutes and post curing at 202° C. for 3 hours in an air-circulated oven.

The test specimens exhibit the following physical properties before and after aging* at 260° C. for 500 hours.

| Test Temp. | Hardness Shore A | Modulus at 10% Elong. MPa | Tensile Strength MPa | Tear Strength KN/M | Elongation % |
|---|---|---|---|---|---|
| 25° C. | 63 | 0.92 | 4.20 | 13.60 | 45 |
| 232° C. | 63 | 0.88 | 1.75 | 6.20 | 24 |
| 232° C.* | 68 | 1.05 | 1.90 | 5.15 | 13 |

*Upon aging these materials exhibit good retention of physical properties. Thermal conductivity is improved and percent weight loss is lower than in compounds without the aluminum powder.

*Upon aging these materials exhibit good retention of physical properties. Thermal conductivity is improved and percent weight loss is lower than in compounds without the aluminum powder.

EXAMPLE 6

A base compound prepared as in Example 1 is mixed with the same ingredients as in Example 5 but with the exception of weight of aluminum powder. Aluminum powder (450.00 gms., −325 Mesh) is combined with ingredients listed in Example 5. After mixing, the elastomer composition has a working time of 3 hours.

Molded articles cured according to procedure of example 5 exhibit good physical properties. Retention of physical properties after aging is good. Improvement in thermal conductivity (10.8 $10^{-4}$ cal. sec.$^{-1}$ cm.$^{-1}$ °C.) and percent weight loss (3.7%) is also found.

EXAMPLE 7

A base compound prepared as in Example 1 is mixed on a 80×180 mm. two-roll vented research mill with the following ingredients:

| | Component | Amount |
|---|---|---|
| 1. | Base compound (Example 1) | 480.00 gms. |
| 2. | Iron Powder (−230 Mesh) | 480.00 gms. |
| 3. | Silicone Fluid 200 (100,000 centistokes at 25° C.) | 48.00 gms. |
| 4. | Silastic J. Curing Agent | 48.00 gms. |
| 5. | Cure Modifier E - 1990 - 76 | 0.96 gms. |

After 20 minutes of mixing at ambient temperature, the mix had a working time of 6.20 hours. Upon completion of de-airation, the mixture is molded according to conditions of Example 1. The physical properties before and after aging* at 260° C. for 500 hours are listed below.

| Test Temp. | Hardness Shore A | Modulus at 10% Elong. MPa | Tensile Strength MPa | Tear Strength KN/M | Elongation % |
|---|---|---|---|---|---|
| 25° C. | 65 | 0.97 | 3.70 | 12.90 | 38 |
| 232° C. | 65 | 0.74 | 1.59 | 5.00 | 20 |
| 232° C.* | 77 | 0.86 | 1.60 | 4.60 | 17 |

*Improvements in thermal conductivity (7.85 $10^{-4}$ cal. sec.$^{-1}$ cm.$^{-1}$ °C.)$^{-1}$ and percent weight loss upon aging are observed.

*Improvements in thermal conductivity (7.85 $10^{-4}$ cal. sec.$^{-1}$ cm.$^{-1}$ °C.)$^{-1}$ and percent weight loss upon aging are observed.

EXAMPLE 8

Example 7 is repeated with the exception that lower amounts of iron powder (380 gms.) is used for making the elastomer compound. After mixing, the material exhibits a working time of 8 hours.

Molded specimens of various thicknesses exhibit improved thermal conductivity and percent weight losses upon aging at 260° C. for 500 hours.

EXAMPLE 9

Example 7 is repeated with the exception that a higher amount of iron powder (580 gms.) is used for preparing the elastomer compound. Working time of mixture is 4.5 hours. Molded specimens according to conditions of Example 7 exhibited improvement in thermal conductivity and no improvements in weight loss.

EXAMPLE 10

A base compound prepared as in Example 1 is mixed with the same ingredients as in Example 1 with the exception of silicon powder. Chromium powder is used as follows:

| | Component | Amount |
|---|---|---|
| 1. | Base Compound | 400.00 gms. |
| 2. | Chromium Powder (−325 Mesh) | 300.00 gms. |
| 3. | Silicone Fluid 200 (100,000 centistokes at 25° C.) | 40.00 gms. |
| 4. | Silastic J Curing Agent | 40.00 gms. |
| 5. | Cure Modifier E - 1990 - 76 | 0.80 gms. |

The ingredients are mixed as in Example 1. Upon completion of mixing, this compound has a working time of 7.0 hours.

Moldings are made according to conditions described in example 1. The physical properties before and after aging at 260° C. for 500 hours are as follows:

| Test Temp. | Hardness Shore A | Modulus at 10% Elong. MPa | Tensile Strength MPa | Tear Strength KN/M | Elongation % |
|---|---|---|---|---|---|
| 25° C. | 63 | 0.65 | 3.00 | 12.8 | 40 |
| 232° C. | 63 | 0.68 | 1.30 | 5.10 | 20 |
| 232° C.* | 77 | 0.00 | 1.02 | 4.90 | 18 |

Improvement in thermal conductivity is observed (8.1 $10^{-4}$ cal. sec.$^{-1}$ cm.$^{-1}$ °C.) but no substantial improvement in weight losses upon aging.

EXAMPLE 11

The procedures of Example 10 are repeated with the exception that 200 gms. of chromium powder is used (−325 Mesh). Upon mixing the mixture has a working time of 8.5 hours. Molded articles show improvements in thermal conductivities over compounds containing no chromium powder.

EXAMPLE 12

The procedures of example 10 are repeated with the exception that 400 gms. of chromium powder are mixed with other ingredients. After molding the mixture under same conditions as in Example 10, the articles exhibit improvements in thermal conductivity.

EXAMPLE 13

Example 1 is repeated with the exception that 55.0 gms. of the Silicone Fluid 200 is used for preparing the mixture. The molded articles have improved thermal conductivity.

EXAMPLE 14

Example 1 is repeated with the exception that 30 gms. of the Silicone Fluid 200 are used in preparation of compound. After molding specimens according to procedure of Example 1, they exhibit good properties before and after aging at 260° C. for 500 hours. Improvement in thermal conductivity and percent weight losses are found.

EXAMPLE 15

Example 6 is repeated with the exception of weight of the Silicone Fluid 200 (70.00 gms.). The mixture is processable and upon molding has improved properties.

EXAMPLE 16

Example 1 is repeated with the exception of Silicone Fluid 200. An equal amount of a lower viscosity fluid (60,000 centistokes, 40.00 gms.) is employed. Upon mixing and molding, the compounds have good properties.

EXAMPLE 17

Example 5 is repeated with exception that 40.00 gms. of a lower viscosity Silicone Fluid (30,000 centistokes at 25° C.) is used. Similar results are seen.

EXAMPLE 18

Examples 1, 2, 4 or 5 are repeated, except for varying the amount of cure modifier E-1990-76 (0.6 to 1.5 gms.). Similar results are seen.

EXAMPLE 19

Examples 1, 2, 4 and 5 are repeated except Silastic E RTV Silicone Elastomer is used on an equal weight basis to replace the Silastic J RTV Silicone Elastomer in making the base compound. Similar results are seen.

EXAMPLE 20

Examples 1, 2, 4 and 5 are repeated, except Silastic L RTV Silicone Elastomer on an equal weight basis to replace the Silastic J RTV Silicone Elastomer is used in making the base compound. Similar results are seen.

METAL ALLOY COMPOSITIONS

EXAMPLE 21

The base compound described in Example 1 is combined with the following ingredients according to mixing procedure of Example 1.

| | Component | Amount |
|---|---|---|
| 1. | Base Material (Example 1) | 400.00 gms. |
| 2. | Nickel-Aluminum Alloy (80/20 by weight) | 400.00 gms. |
| 3. | Silicone Fluid 200 (100,000 centistokes at 25° C.) | 40.00 gms. |
| 4. | Curing Agent (Silastic j) | 40.00 gms. |
| 5. | Cure Modifier E - 1990 - 76 | 0.80 gms. |

After mixing above ingredients, the compound has a working time of 8 hours.

After molding this silicone elastomer composite according to conditions described in Example 1, the virgin and aged specimens* at 260° C. for 500 hours have the following physical properties:

| Test Temp. | Hardness Shore A | Modulus at 10% Elong. MPa | Tensile Strength MPa | Tear Strength KN/M | Elongation % |
|---|---|---|---|---|---|
| 25° C. | 60 | 0.62 | 3.23 | 13.30 | 47 |
| 232° C. | 62 | 0.68 | 1.35 | 5.07 | 20.0 |
| 232° C. | 62 | 0.84 | 1.08 | 4.65 | 13.0 |

These materials exhibit higher thermal conductivity values than compositions with other metal alloy powders ($11.70 \cdot 10^{-4}$ cal. sec.$^{-1}$.cm.$^{-1}$.°C.$^{-1}$). Lower weight losses are also found after aging at 260° C. for 500 hours. Aging at 260° C. for 500 hours has no effect on hardness.

EXAMPLE 22

A base compound prepared as in Example 2 is mixed with the following ingredients according to procedure of Example 1.

| | Component | Amount |
|---|---|---|
| 1. | Base Compound (Example 1) | 600.00 gms. |
| 2. | Tungsten-Copper (75/25 by weight) Alloy Powder | 600.00 gms. |
| 3. | Silicone Fluid 200 (100,000 centistokes at 25° C.) | 60.00 gms. |
| 4. | Silastic J Curing Agent | 60.00 gms. |
| 5. | Cure Modifier E - 1990 - 76 | 1.20 gms. |

The mixture has a longer working time (15 hours). The alloy powder appears to have an effect on working time.

After molding this silicone compound according to conditions described in example 1, the virgin and aged* specimens at 260° C. for 500 hours have the following physical properties:

| Test Temp. | Hardness Shore A | Modulus at 10% Elong. MPa | Tensile Strength MPa | Tear Strength KN/M | Elongation % |
|---|---|---|---|---|---|
| 25° C. | 60 | 0.90 | 3.21 | 13.90 | 43 |
| 232° C. | 61 | 0.67 | 1.22 | 5.34 | 19 |
| 232° C. | 66 | 0.89 | 1.40 | 4.85 | 17 |

These molded materials exhibit also improved thermal conductivity ($5.98 \cdot 10^4$ cal. sec.$^{-1}$.cm.$^{-1}$.°C.$^{-1}$) and lower weight loss (aging at 260° C. for 500 hours) than materials without the metal alloy powder. Hardness (Shore A) change with aging is very insignificant.

EXAMPLE 23

To a base compound prepared as in Example 1, the following ingredients are added according to procedure of Example 1.

| | Component | Amount |
|---|---|---|
| 1. | Base Compound (Example 1) | 400.00 gms. |
| 2. | Nickel-Copper (70/30 by weight) Alloy Powder | 400.00 gms. |
| 3. | Silicone Fluid 200 (100,000 centistokes at 25° C.) | 40.00 gms. |
| 4. | Silastic J Curing Agent | 40.00 gms. |
| 5. | Cure Modifier E - 1990 - 76 | 0.80 gms. |

After mixing and de-aeration the mixture has a working time of 8.5 hours.

Following molding of this silicone elastomer composite, the physical, chemical and thermal properties are determined.

| Test Temp. | Hardness Shore A | Modulus at 10% Elong. MPa | Tensile Strength MPa | Tear Strength KN/M | Elongation % |
|---|---|---|---|---|---|
| 25° C. | 60 | 0.67 | 3.75 | 12.00 | 55 |
| 232° C. | 60 | 0.81 | 1.55 | 7.9 | 20 |
| 232° C. | 62 | 0.64 | 1.35 | 3.2 | 21 |

Molded samples exhibit improved thermal conductivity ($10.2 \cdot 10^{-4}$ cal. sec.$^{-1}$ cm.$^{-1}$.°C.$^{-1}$) and lower weight loss on aging at 260° C. for 500 hours. No change in hardness with aging is observed.

EXAMPLE 24

Example 23 is repeated with the exception that the nickel-copper alloy is replaced by an equivalent amount of aluminum-silicon (89/11 by weight). After mixing, the elastomer composite has a working time of 4 hours.

Molded articles according to procedure of example 1 possess good physical properties. They also exhibit improved thermal conductivity and lower weight loss on aging at 260° C. for 500 hours.

EXAMPLE 25

Example 23 is repeated with the exception that the nickel-copper alloy powder is replaced by 373 g. of Iron-Silicon-Magnesium (80/10/10 by weight) alloy powder. After mixing the compound has a working time of 1 hour.

Molded specimens cured according to conditions of example 1 have the following physical properties:

| Test Temp. | Hardness Shore A | Modulus at 10% Elong. MPa | Tensile Strength MPa | Tear Strength KN/M | Elongation % |
|---|---|---|---|---|---|
| 25° C. | 69 | 1.09 | 4.80 | 10.80 | 52 |
| 232° C. | 72 | 0.75 | 2.75 | 4.72 | 32 |
| 232° C. | 82 | 1.10 | 2.70 | 4.90 | 12 |

Improvements in thermal conductivity (7.98·10$^{-4}$ cal. sec.$^{-1}$.cm.$^{-1}$ °C.$^{-1}$) and percent weight loss are found. A small change in hardness (Shore A) is observed on aging of material at 260° C. for 500 hours.

EXAMPLE 26

A base compound prepared as in Example 1 is combined with the following ingredients:

| Component | Amount |
|---|---|
| 1. Base Compound | 400.00 gms. |
| 2. Inconel Powder (−325 Mesh, Nickel-Chromium Iron alloy) | 380.00 gms. |
| 3. Silicone Fluid 200 (100,000 CSK at 2506) | 40.00 gms. |
| 4. Silastic J Curing Agent | 40.00 gms. |
| 5. Cure Modifier E - 1990 - 76 | 0.80 gms. |

Following mixing and de-aeration the mixture exhibits a working time of 6.5 hours.

The physical, chemical and thermal properties of molded articles cured as in Example 1 are determined as described in this document. Physical properties are as follows:

| Test Temp. | Hardness Shore A | Modulus at 10% Elong. MPa | Tensile Strength MPa | Tear Strength KN/M | Elongation % |
|---|---|---|---|---|---|
| 25° C. | 67 | 1.35 | 3.00 | 18.40 | 31 |
| 232° C. | 67 | 1.63 | 1.80 | 11.70 | 12 |
| 232° C. | 75 | 1.45 | 1.58 | 3.80 | 10 |

Improvements in thermal conductivity and percent weight loss are observed. After aging, very small change in hardness is found.

EXAMPLE 27

To a base compound prepared as in Example 1 the following ingredients are added as in Example 1.

| Component | Amount |
|---|---|
| 1. Base Compound (Example 1) | 400.00 gms. |
| 2. brass powder (#2B-126)(Cu 52%, SN 48% by weight) | 300.00 gms. |
| 3. Silicone Fluid 200 (100,000 CSK at 25° C.) | 40.00 gms. |
| 4. Silastic J Curing Agent | 40.00 gms. |
| 5. Cure Modifier E - 1990 - 76 | 0.80 gms. |

After mixing and de-aeration the mixture has a very long working time (20 hours). After molding compound as in Example 1, the molded articles have the following physical properties:

| Test Temp. | Hardness Shore A | Modulus at 10% Elong. MPa | Tensile Strength MPa | Tear Strength KN/M | Elongation % |
|---|---|---|---|---|---|
| 25° C. | 39 | 0.37 | 1.70 | 6.10 | 62 |
| 232° C. | 38 | 0.22 | 0.67 | 2.13 | 28 |
| 232° C.* | 37 | 0.31 | 0.58 | 2.20 | 18 |

Improved thermal conductivity and percent weight loss are found. The brass powder appears to affect the reaction and results in softer elastomer articles.

EXAMPLE 28

Example 23 is repeated with the exception that the brass powder (#2 B-226) is replaced by an equivalent weight of Bronze Powder (B-402, −100 mesh 50-50 Cu/Zn). After mixing the silicone elastomer composite has a working time of 3.5 hours.

After molding the mixture according to procedure of Example 1, the molded articles have good physical properties before and after aging. They also exhibit improved thermal conductivity.

In the above examples 1–28 the Silicone Fluid 200 and 705 (viscosity modifier) are silicone fluid number designations of fluids available from the Dow Corning Corporation. Silicone fluid designated by viscosity are also available from Dow Corning.

The Silastic J, E and L (i.e. crosslinking polymer) as well as Silastic Curing Agent (i.e. crosslinking oligomer) and Cure Modifier E-1990-76 are also available from the Dow Corning Corporation.

Information on the Silicone Fluid 200 used in the above Examples may be obtained from Form No. 22-069C-76 of Dow Corning Corp. Information on Silicone Fluid 705 (Dow Corning 705 Diffusion Pump Fluid described as pentaphenylmethyltrisiloxane) used in the above Examples may be had from Bulletin 22-287 date 8/74 from Dow Corning Corp. Information on Silastic J RTV Silicone Elastomer (and curing agent) used in the above Examples may be obtained from Form No. 61-080A-76 of Dow Corning Corp. Information on Silastic E and L elastomers used in the above Examples may be obtained from Form No. 61-326-76 of Dow Corning Corp. These ingredients are all deemed within the scope of the invention as hereinbefore disclosed.

It is to be understood that organosiloxanes as hereinbefore described by formula (e.g. formula I, I', II, etc.) may as a practical matter also contain minor amounts (e.g. up to 20 weight percent) of impurities which do not correspond to the formulas as set forth and still be within the scope of this invention.

What is claimed is:

1. A thick, highly filled, shaped elastomeric body made by filling a cavity with a dispensable elastomer precursor consisting essentially of:

I. 100 parts by weight of an olefinically unsaturated crosslinkable polysiloxane having the formula:

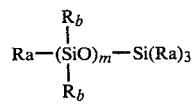

$$R_a-(SiO)_m-Si(R_a)_3 \qquad \text{I}$$

with $R_b$ substituents on the Si atoms.

wherein at least most of the Ra's and Rb's are selected from (A) saturated hydrocarbyl and hydrocarbyloxy groups having 1 to about 10 carbon atoms that are alkyl or aryl or alkyl and aryl and (B) allyl or vinyl groups, but wherein up to about 25% of the Rb's may be

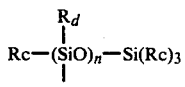

$$Rc-(SiO)_n-Si(Rc)_3 \quad I(a)$$

wherein at least most of the Rc's and Rd's are selected from (A) and (B) above but up to about 10% of the Rd's may contain additional siloxane units with substituents selected from (A) and (B) or still additional siloxane units; and still further wherein (1) the average number of siloxane units per polymer is between 150 and 250 and (2) there is an average of above about 1.5 but lower than 2.5 crosslinking sites selected from the vinyl, allyl or vinyl and allyl groups per polymer molecule;

II. about 60-500 parts by weight of finely divided particulate comprising:
  (A) silica 60-500 parts by weight ratio to the polysiloxane of I. of between about 0.3 and 2.5:1 wherein the silica particulate comprises:
    1. ground silica having an average particle diameter between about 0.5 and 10 microns; and
    2. fumed silica having an average particle diameter between about 0.010 and 0.014 microns;
  (B) thermally conductive alloy powder at a weight ratio to the polysiloxane of I. of between 0.3 to 2.5:1 wherein the alloy is an alloy of a first row transition metal;

III. a viscosity modifier comprising a silicone oil having a viscosity between about 1000–1,000,000 centistokes at 25° C. at a weight ratio to the particulate of II of between about 1:20–1:4 oil to particulate; and IV. a silyl hydride functional polysiloxane oligomer containing between about 5 and about 50 siloxane groups at a weight ratio with respect to the polysiloxane of I. of between about 1:3 to 1:20, the silyl hydride functional polysiloxane oligomer having an average of more than 1 and less than 20 silyl hydride groups per polymer chain.

2. The elastomeric body in accordance with claim 1, wherein the crosslinkable polysiloxane is substantially free of branching.

3. The elastomeric body in accordance with claim 1, wherein the viscosity modifier comprises a dialkylpolysiloxane.

4. The elastomeric body in accordance with claims 1 or 2 or 3 wherein I (B) is vinyl.

5. The elastomeric body in accordance with claim 4, wherein the silyl hydride polysiloxane oligomer of said dispensable elastomer percursor has the formula:

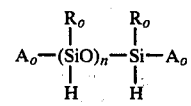

wherein n averages between about 5 and about 14, $R_o$ is selected from the group consisting of alkyl or alkoxy groups having 1-3 carbons, phenyl, and phenoxy groups, and $A_o$ is selected from the groups consisting of alkyl groups having 1-3 carbons, and phenyl.

6. The elastomeric body in accordance with claim 4, wherein the weight ratio of ground silica II(A) to fumed silica II(B) is greater than 2:1.

7. An elastomeric body in accordance with claim 6, wherein the weight ratio of silica to the polysiloxane of I. is between about 0.9:1 to 1:0.9.

* * * * *

UNITED STATES PATENT AND TRADEMARK OFFICE
CERTIFICATE OF CORRECTION

PATENT NO. : 4,293,477
DATED : October 6, 1981
INVENTOR(S) : Ares N. Theodore

It is certified that error appears in the above-identified patent and that said Letters Patent are hereby corrected as shown below:

At column 17, line 21, cancel "60-500 parts by" and replace with --particulate at a--.

Signed and Sealed this

Thirty-first Day of May 1983

[SEAL]

Attest:

DONALD J. QUIGG

Attesting Officer

Acting Commissioner of Patents and Trademarks